United States Patent [19]

Suzuki

[11] Patent Number: 4,637,304
[45] Date of Patent: Jan. 20, 1987

[54] METHOD OF MAKING MAKI-ZUSHI AND AN APPARATUS FOR MAKING MAKI-ZUSHI

[76] Inventor: Kisaku Suzuki, 19-8, Toshida 1-chome, Nerima-Ku, Tokyo, Japan

[21] Appl. No.: 651,090

[22] Filed: Sep. 17, 1984

[30] Foreign Application Priority Data

Sep. 22, 1983 [JP] Japan .................................. 58-176722
Dec. 28, 1983 [JP] Japan ........................... 58-205168[U]

[51] Int. Cl.⁴ .......................... A23P 1/00; B29C 69/00
[52] U.S. Cl. ................................. 99/450.2; 99/450.6; 99/450.7; 425/383
[58] Field of Search ............... 425/383, 391, 390, 403, 425/110, 319, 321, 322, 403, 406, 441, 442, 450.1; 99/450.1, 450.3, 450.6, 450.7, 450.2; 53/215, 216, 115–118

[56] References Cited

U.S. PATENT DOCUMENTS

| | | | |
|---|---|---|---|
| 1,171,331 | 2/1916 | Embrey | 425/321 |
| 1,296,724 | 3/1919 | Winget | 53/215 |
| 1,558,284 | 10/1925 | Paley | 425/218 |
| 1,757,306 | 5/1930 | Harber et al. | 425/321 |
| 2,592,065 | 4/1952 | Petri | 53/215 |
| 2,635,401 | 4/1953 | Cook et al. | 53/215 |
| 2,750,723 | 6/1956 | Fisher | 53/215 |
| 2,780,227 | 2/1957 | Benning et al. | 53/216 |
| 3,244,181 | 4/1966 | Molvar | 53/215 |
| 3,603,268 | 9/1971 | Wietzel | 425/320 |
| 3,760,562 | 9/1973 | Walsh | 53/215 |
| 3,993,422 | 11/1976 | Riviere et al. | 425/321 |
| 4,171,197 | 10/1979 | Sato | 99/450.2 |
| 4,516,487 | 5/1985 | Madison et al. | 99/450.2 |

FOREIGN PATENT DOCUMENTS

1318410 1/1963 France .................................. 53/215

Primary Examiner—Willard E. Hoag
Attorney, Agent, or Firm—Fred Philpitt

[57] ABSTRACT

A method of making maki-zushi comprising a preparation process in which a sheet is placed on a sheet frame and said sheet mounts a shari (sushi rice, namely, vinegared rice), gu (ingredients) such as kampyo (dried gourd shavings), cucumber, tuna or the like, and nori (laver), and a maki-zushi (a vinegared rice rolled in laver) materials are disposed with a [play] to roll up the maki-zushi by rolling in the shari, gu, and nori; a rolling in and rolling up process provided with a rolling in and rolling up mechanism in which part of the sheet is rotated in a half turn by utilizing the part of the [play] of the sheet and it is formed into a cylindrical shape for rolling in the shari and is shifted in a direction where the part of the sheet is rolled in and the laver is caused to wrap the shari with the nori to make the maki-zushi; a pressure molding process provided with a pressure molding mechanism in which a pressure mold and a receiving mode are installed on a chain conveyor by providing a so called interval and the pressure mold and the receiving mold are adapted to expand the open surfaces of both the molds when they pass the sprocket and provide conditions where the maki-zushi is easily received and is easily discharged, and their open surfaces are narrowed when both the molds pass the sprocket; and a feeding process provided with a belt conveyor for feeding the molded maki-zushi to a next process.

1 Claim, 14 Drawing Figures

METHOD OF MAKING MAKI-ZUSHI AND AN APPARATUS FOR MAKING MAKI-ZUSHI

BACKGROUND OF THE INVENTION

Nori-maki (laver roll) is one kind of maki-zushi (rolled sushi, nori wrapped sushi with core material) (zushi and sushi mean the same although pronounced differently due colloquial expression), and to make nori-maki, a gu (ingredients, core material) is placed on a bed of shari (sushi rice), which is then rolled up in toasted nori (laver). Lots of things can be used in nori-maki. To say almost any food is only a slight exaggeration. Making this sushi is a good way to creatively use such varied ingredients as shiitake (mushrooms) and pickled plums. Another kind of nori-maki is kampyō-maki, which is made with dried gourd strips. A still another kind of nori-maki is tekka-maki, containing red tuna flesh. A yet still another kind of nori-maki is kappa-maki with the green core, made with sliced cucumber. These three kinds are typical nori-maki. Sushi made by rolling certain ingredients in nori (laver) with the aid of a small bamboo mat (makisu) and then, cutting the rolls into slices is a great favorite in Japan. It is most enjoyable if eaten right after making, while the nori is still crisp, but if eaten later the same day it's still good. It is often found in lunch boxes or sold as a take-out at sushi counters in department and other stores. The two types are thin rolls (hoso-maki) and thick rolls (futo-maki).

As mentioned above, depending on the material used for the core, thin rolls are of three kinds; tekka-maki, made with tuna; kappa-maki, made with cucumber; and kampyō-maki, made with dried strips of bottle calabash.

In the argot of the Japanese underworld a tekka-ba is a gambling den. The denizens of these establishments didn't like to get their fingers sticky when eating. But, like anybody else, they did get hungry. When they did, they ordered large quantities of rolled tuna sushi to be brought from the nearest sushi shop. In time this type of sushi came to be known as tekka-maki, but needless to say its popularity is by no means restricted to gamblers.

The story behind kappa-maki is that these cucumber rolls were named in honor of the mischievous kappa (water sprite), who is said to be inordinately fond of this food.

These two thin rolls are made in the same way.

1. Half a sheet of toasted nori is spreaded on a bamboo rolling mat (makisu) with about 1 cm (⅜ in.) projecting beyond the nearer edge. In the middle of the nori arrange a band of shari (sushi rice) (about 70 gr.) from left to right. Leave the nori open (about 1 cm on either side of the shari and the center of the band of shari. In this groove lay strips of raw tuna for tekka-maki. Distribute the fish or cucumber evenly and spread wasabi (Japanese horse-radish) on top.
2. Starting at the edge closer to you, use the mat to roll up the sushi. After rolling, make the shape in cross section squarish by pressing the top with your fingers before removing the mat.
3. Take the roll out of the mat, cut the roll in half, then cut each of the halves into 3 equal pieces. Seen in cross section, the shari should be evenly distributed around the core. Kampyō-maki, dried calabash strip rolls is made by a method similar to the above-noted tekka-maki or kappa-maki.

This invention relates to a method of making maki-zushi and to an apparatus for making maki-zushi. More particularly, this invention relates to a method of making maki-zushi comprising a preparation process of disposing a sheet in a sheet frame, disposing the shari and any one of gu (ingredients such as raw tuna flesh in case of tekka-maki) thereon; rolling up process of rotating a shaft and reversing part of the sheet and rolling in the shari, nori, tuna into a cylinder by the part of the sheet; a pressure molding process of molding the maki-zushi roll into a squarish shape; and a feeding process of carrying the maki-zushi roll into a packing process; and to an apparatus for making maki-zushi comprising a rolling in and rolling up mechanism of maki-zushi and a molding mechanism of pressure molding the maki-zushi roll. The making of the maki-zushi by this type of manual work had a limit in mass production, and in order to make large quantities of the maki-zushi, a large number of manpower was needed which was a drawback.

SUMMARY OF THE INVENTION:

An object of this invention is to provide a method of making maki-zushi comprising a preparation process in which a sheet, is installed in a sheet frame and this sheet is provided with a looseness or play for rolling up a maki-zushi by the part of the sheet and a mechanism is formed by a shaft for rolling up the maki-zushi by rotating, the part of the sheet by utilizing the looseness or play of the sheet to form the sheet into a cylinder for rolling in the shari and shifting the part of the sheet in a rolling in direction to wrap the shari with the nori, and a tension shaft for providing a tension on the sheet when the part of the sheet is rotated by a half turn by the shaft; and a shari, gu and nori which are materials of the maki-zushi are mounted on the sheet of the mechanism; and a rolling in and rolling up process in which the part of the sheet is rotated in a half turn to roll in the shari and the part of the sheet is shifted in a direction of rolling in to wrap the shari with the nori to roll up the maki-zushi.

Another object of this invention is to provide an apparatus comprising a sheet mounted in a sheet frame, said sheet being mounted is disposed with a looseness or play so that with these shari, gu and nori, they are rolled in with the part of the sheet to roll up the maki-zushi, and a shaft by which the part of said sheet being rotated in a half turn to a cylinder to roll in the shari by utilizing the portion of the looseness or play of the sheet and the part of the sheet being shifted in a direction of rolling in to wrap the shari with the nori to roll up the maki-zushi, and a tension shaft for providing the tension on the sheet when the part of the sheet is rotated in a half turn by the shaft; and as a result, the maki-zushi can be mechanically and automatically produced.

A still another object of this invention is to provide a pressure molding mechanism in which a pressure mold and a receiving mold are disposed on a chain conveyor of endless type at a predetermined interval, and the pressure mold and the receiving mold become a condition of easily receiving the maki-zushi by expanding the open surfaces when they shift through the sprocket from the top to the bottom, and the open surfaces being narrowed when they pass the sprocket and descend to apply the pressure to the maki-zushi to form it in a squarish form.

A yet still another object of this invention is to provide an apparatus in which a pressure molding mechanism is connected to a rolling in and rolling up mechanism, and the maki-zushi formed in the rolling in and rolling up process is automatically fed to a pressure molding process whereby the production is carried out in series.

DETAILED DESCRIPTION OF THE INVENTION

An apparatus of making maki-zushi shown by ordinary letter S is provided with a sheet 2, and this sheet 2 is installed in a condition with a [play] for rolling in a maki-zushi 1 by fixing both ends of the sheet 2. Namely, a shari 60 and any one of gu 61, such as kampyō, cucumber, tuna, and nori 62 which are materials of the maki-zushi 1 are placed on the sheet 2 with a [play]so that these shari 60, gu 61 and nori 62 are rolled in by the part of the sheet 2 to roll up the maki-zushi 1. The sheet 2 is applied with a surface treatment such as Teflon process by considering its peeling off property so that the nori wastes or the like are adhered to the surface. The sheet 2 is shaped in cylinder for rolling in the shari by turning the part of the sheet 2 in a half turn by utilizing the portion of looseness or play of the sheet 2 and is shifted in a direction of rolling in the part of the cylindrical sheet to warp the shari 60 with the nori 62 to roll up the maki-zushi 1 by a mechanism consisting of a shaft 4 and a tension shaft 3 that gives tension to the sheet 2 when the part of the sheet 2 is rotated in a half turn by the shaft 4. The sheet 2 is disposed at opening surfaces of upper surfaces of box frames 7 and 7.

Case C is provided with the box frames 7 and 7 at its right and left, and these box frames 7 and 7 are formed with an inclination of a predetermined angle to be higher in the rearward than the forward.

Figure 3:
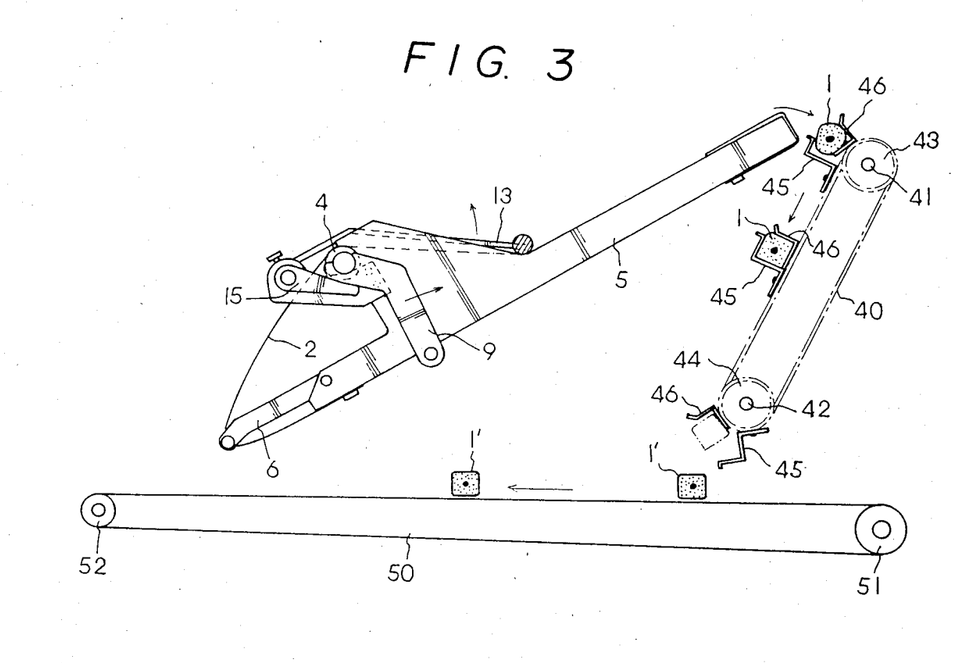
FIG. 3 is a mechanism diagram showing relationship of a sheet frame, a chain conveyor for pressure molding and a belt conveyor for carrying.

The tension shaft 3 for providing a tension to the portion of looseness or play of the sheet 2 is rockably journaled at a front end of a sheet 5 by means of an arm 6 as shown in FIG. 3. In the inside of upper part of the sheet frame 5, a notch 5a for releasing a shari guide 16 is formed.

The shaft 4 for rolling in and rolling up the maki-zushi on the sheet 2 is rotatably journaled to the tips of arms 9 and 9 journaled rockably to gear connected blocks 8 and 8 in the box frames 7 and 7.

The sheet frame 5 axially supporting the tension shaft 3 is mounted on the box frames 7 and 7 by brackets 10 and 10 bulging both sides of the lower part, and is set on the box frames 7 and 7 by engaging hooks 11 and 11 bulging both side of the upper part with metal fittings 12 and 12 provided in the upper parts of the box frames 7 and 7, and the sheet 2 is installed along the inclination of the box frames 7 and 7. On the upper part of the front end of the sheet frame 5, a mounting shaft 14 of an H-shaped shari supply frame 13 is journaled rockably. Also, at both ends of the mounting shaft 14, stoppers 15 and 15 for contacting the shari supply frame 13 on the upper part of the sheet 2 by resisting the tension force of a back spring (not shown) are attached to both ends of the mounting shaft 14. This stopper 15 whose one end is engaged with a bulged portion 4a of the shaft 4, and the stopper 15 is released according to the rising rotation of the shaft 4, and the shari supply frame 13 is caused to reverse and rise by the tension force of the back spring.

A reference numeral 16 denotes a shari guide for controlling the length and thickness of the maki-zushi 1 when the maki-zushi 1 is rolled in, and is mounted on a mounting plate 17 connected indirectly to the gear connected block 8 so as to be rockable in right and left directions, and a slide guide 38 is projected on the side surface. This slide guide 38 plays a role of opening the shari guide 16 outward by abutting on a guide plate 18 integral with the hook 11.

Figure 2:
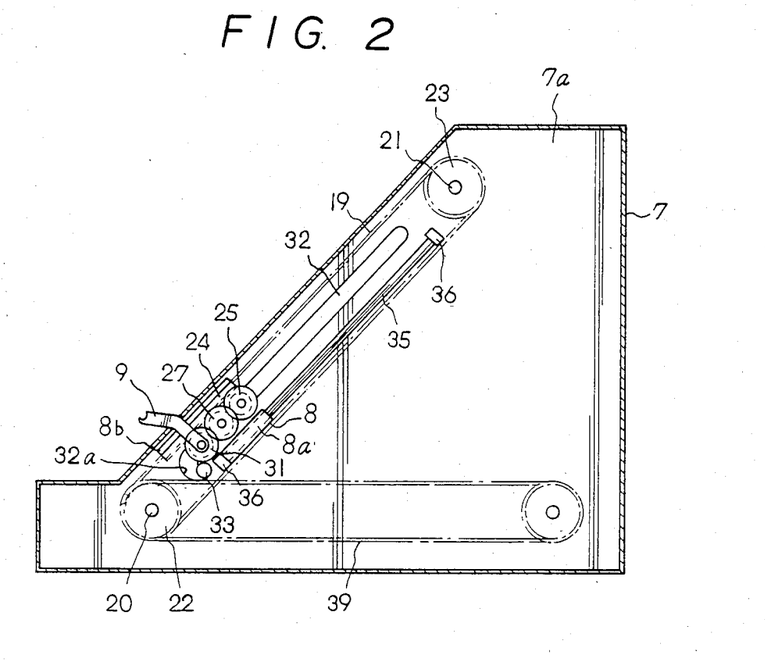
FIG. 2 is a side view showing a drive mechanism for reversibly shifting the part of the sheet installed in a box frame.

As shown in FIG. 2, a chain 19 for rocking and raising the arm 9 by means of a reduction gear or the like is spanned between sprockets 22 and 23 wedged to a drive shaft 20 and a driven shaft 21 journaled to the box frames 7 and 7, and a rack 14 is interposed in the middle.

Figure 4:
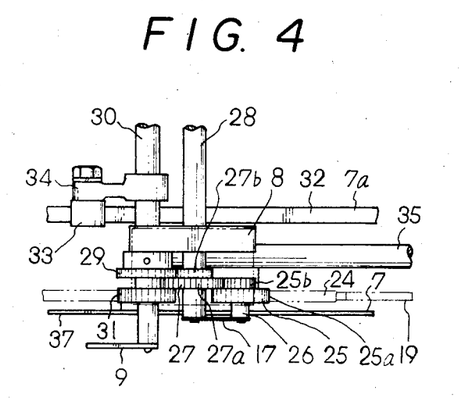
FIG. 4 is a plan for rolling up drive unit.
Figure 5:
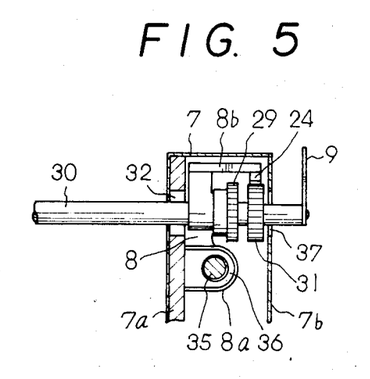
FIG. 5 is its cross sectional view.

As shown in FIGS. 4 and 5, a two-step gear 25 meshed with a rack 24 and a large diameter gear 25a is such that its shaft 26 is journaled with the gear connected block 8, and a small diameter gear 25b is meshed with a large diameter gear 27a of a middle two-step gear 27, and a rotating force transmitted from the chain 19 is transmitted at a decreased speed to the middle two-step gear 27.

The middle two-step gear 27 meshed with the small diameter gear 25b of the two-step gear 25 is disposed in such a way that its shaft 28 is journaled to the gear connected block 8 similar to the two-step gear 25, and the small diameter gear 27b is meshed with a large diameter gear 29, and moreover, the speed decreased rotating force is transmitted to a shaft 30.

The shaft 30 of the gear 29 is journaled to the gear connected block 8 similar to the two-step gear 25 and the middle two-step gear 27, and a gear 31 of a looseness or play of large diameter meshed with the rack 24 is journaled similar to the large diameter gear 25a of the two-step gear 25, and a mounting arm 34 of a guide roller 33 sliding in a guide groove 32 notched in a thick inner plate 7a of the box frames 7 and 7 is journaled. At the lower end of the guide groove 32, a recessed portion 32a of the guide roller 33 is formed.

The gear connected block 8 for pivotally supporting the shafts 26, 28 and 30 of the two-step gear 25, middle two-step gear 27 and gear 29 are disposed in such a way that its lower end 8a is slidably inserted to a guide rail 35 mounted on the inner plate 7a of the box frame 7, and its upper end is connected and fixed to the rack 24 by means of a connecting plate 8b, and it makes lifting and reciprocating motions in a fixed range according to a movement of the chain 19. The rolling in and rolling up operation of the maki-zushi 1 is carried out by the lifting and reciprocating motions.

Figure 1:
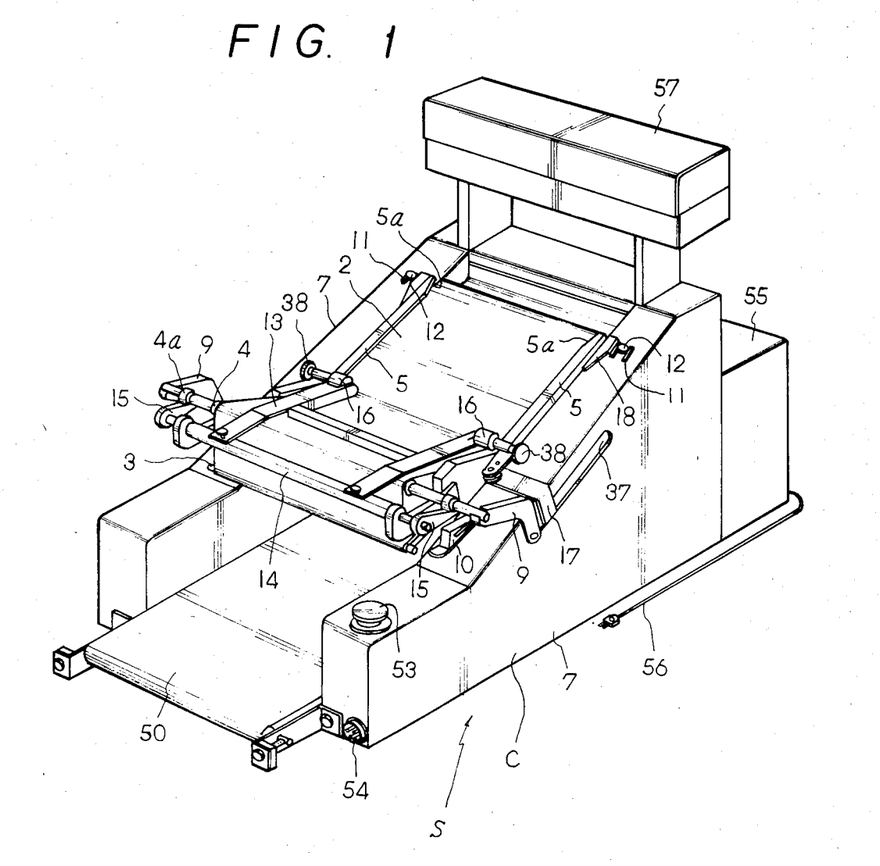
FIG. 1 is a perspective view of this apparatus.

The guide rail 35 is journaled to receiving plates 36 and 36 mounted on the box frame 7. As shown in FIGS. 1 and 5, a guide groove 37 is notched on an outer plate 7b of the box frame 7 for allowing the passing of the projected portions of shafts 26, 28 and 30 journaled to the gear connected block 8 when the gear connected block 8 makes the lifting motions. Reference numeral 39 denotes a chain sprocket mechanism for rotating the drive shaft 20 of the chain 19, and is connected to a motor (not shown).

Reference numeral 40 denotes a chain conveyor, and is wound up by a rolling in and rolling up mechanism, and receives the maki-zushi 1 lifted upward, and is spanned between sprockets 43 and 44 wedged to a drive shaft 41 and a driven shaft 42 journaled to the box frames 7 and 7 in order to mold the maki-zushi 1 into an angular round shape, and a receiving mold 45 and a pressure mold 46 for molding the lifted round maki-zushi 1 into the angular round shape are disposed on the surface at a predetermined interval. This receiving mold 45 and the pressure mold 46 are adapted in such a way that the chain conveyor 40 rotates the upper sprocket 43 to shift from the ascending to the descending and expands the open surfaces of the molds when the upper sprocket 43 is rotated, and receives the round lifted maki-zushi 1 and pressure molds the maki-zushi 1 into the angular round shape as the open surfaces of the molds are narrowed when it is inclined and descended, and the molds are open at the lowest point to transfer the angular round molded maki-zushi 1' to a horizontal belt conveyor 50.

The belt conveyor 50 that carries the angular round molded maki-zushi 1' to a next process such as packing process is spanned between a drive roll 51 and a driven roll 52 journaled at the lower parts of the box frames 7 and 7, and rotates in a direction of an arrow.

Reference numeral 53 denotes a start switch for starting the chain sprocket mechanism 39 for rolling in and rolling up operation, the chain conveyor 50 of the molding process, and the belt conveyor 50. In the lower part of the elevation of the start switch 53 is connected to a jack 54 for connection to a foot switch (not shown).

Reference numeral 55 denotes a drive control chamber attached to the rear surfaces of the box frames 7 and 7, and is built in with a mechanism for drive controlling the reciprocating motions of the chains 19 and 19 spanned in conveyor 40 for receiving the maki-zushi 1 and molding the maki-zushi into the angular round shape by the receiving mold 45 and the pressure mold 46 by taking a timing, and a drive mechanism of the belt conveyor 50 for carrying the molded maki-zushi 1' to a next process such as a packing process, and is connected to a cord 56 with a plug for connection to these drive mechanisms and the power source.

Reference numeral 57 denotes a nori case that accommodates a nori 62, and is made of acrylic resin that allows the inside to be seen from the outside.

In the apparatus of making the maki-zushi which comprises the foregoing construction, the maki-zushi is prepared in the following processes.

(1) Preparation process

Figure 6:
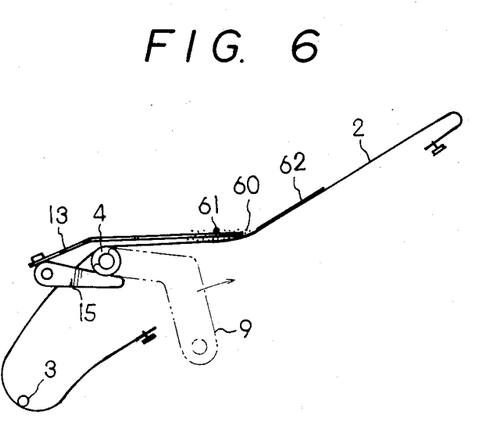
FIG. 6 is a schematic side view of a preparation process.

In the conditions of FIG. 1 and FIG. 6 in which the lower part of the sheet 2 of this apparatus (the portion from the shari guide 16 to the shaft 4) is flat and the shari supply frame 13 is set, the bed of the shari 60 is formed in the shari supply frame 13, and a groove is formed in its center, and any one of gu 61 such as kampyo, cucumber, tuna is placed in this groove, and the nori 62 is placed in the inclined lower part whereby the preparation process is completed.

(2) Rolling in and rolling up process

Figure 7:
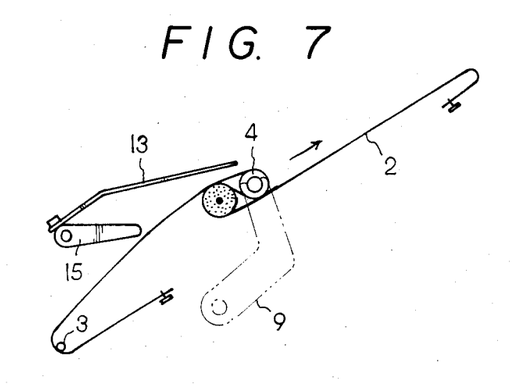
FIG. 7 is a schematic side view of a rolling in process.
Figure 8:
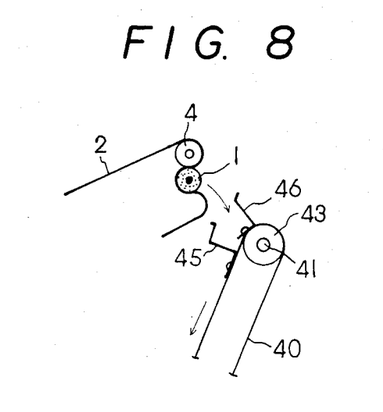
FIG. 8 is a schematic partial side view of a condition where maki-zushi is transferred from a rolling in process to a molding process.
Figure 9:
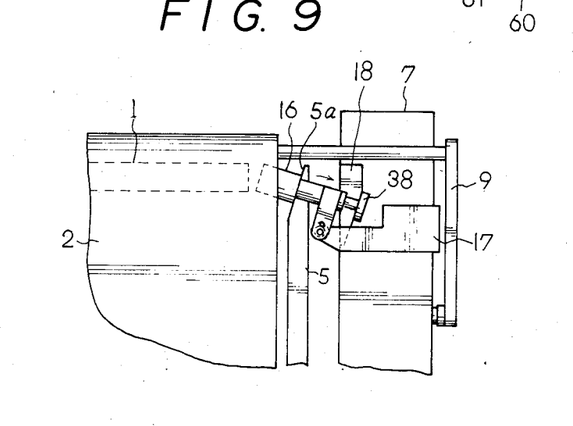
FIG. 9 is a partial elevational view of a condition where a shari guide is open.
Figure 10:
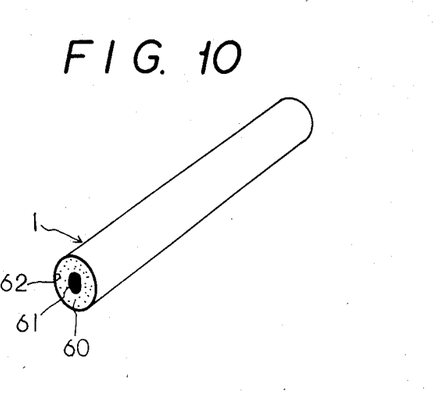
FIG. 10 is a perspective view of the maki-zushi roll.

When the start switch 53 is pressed, the chain 19, chain conveyor 40, belt conveyor 50 rotate in a direction shown by an arrow. When the chain 19 is rotated, the speed decreased rotating force transmitted from the two-step gear 25 meshed with the raok 24 through the middle two-step gear 27 and the gear 29 is transmitted to the shaft 30. When the shaft 30 is rotated, the arm 9 is rocked, whereby the stopper 15 is released, and the shari supply frame 13 is reversed upward by the spring force, and the guide roller 33 is raised from the lower end recessed portion 32a of the guide groove 32. At this time, the gear connected block 8 too is guided by the guide rail 35 to be elevated. When the guide roller 33 is shifted to a linear portion of the guide groove 32, the arm 9 is raised in the condition where the rocking motion is stopped. When the chain 19 further rises, as shown in FIG. 7, the arm 8 rotates to enclose the shari 60 with the sheet 2, and the shari 60 is pushed into a cylindrical shaped portion formed by the shari guides 16, 16 and the sheet 2, and simultaneously, it is lifted on the sheet 2 while it being rolled in the nori 62 placed on the inclined portion of the sheet 2. As shown in FIG. 10, the gu 61 is placed in the center portion of the shari 60, and the shari 60 is wrapped with the nori 62, and thus, the maki-zushi 1 is formed. The maki-zushi 1 is transferred to the receiving mold 45 of the chain conveyor 40 from the upper end of the sheet 2 as shown in FIGS. 3 and 8.

(3) Molding process

The maki-zushi 1 transferred to the receiving mold 45 from the preceding process is pressed by the pressure mold 46 that follows the receiving mold 45 according to the rotating motion of the chain conveyor 40, and is pressure molded from the circular pillar shape at the time of inclination descending motion to the angular pillar shape, and the molds open as the pressure mold 46 moves ahead at the lowest point, and thus the maki-zushi 1' molded in the angular pillar shape is produced and is transferred to the belt conveyor 50.

(4) Feeding process

The maki-zushi 1' transferred to the belt conveyor 50 molded in the angular pillar shape in the preceding process is carried to the lower part of the front surface of this apparatus by the belt conveyor 50, and is transferred to a next process such as a packing process.

In the foregoing process, the reciprocating motion in the rolling in process descends by transmitting a reversing instruction to the drive motor (not shown) by the limit switch. Also, a positional relationship of the maki-zushi 1' to the molding process from the rolling in and rolling up process and the receiving mold 45 is set in a preset condition so that the maki-zushi is smoothly transferred.

By the way, after the foregoing operation is completed, the gear connected block 8 descends and the guide roller 33 reaches the lower end recessed portion 32a of the guide groove 32, and accordingly, the winding arm 9 is rocked in an opposite direction to hold the stopper 15 down by resisting the tension force of the spring as shown in FIG. 1, and the shari supply frame 13 is set again at a lower flat position of the sheet 2 in the condition shown in FIG. 1.

Figure 11:
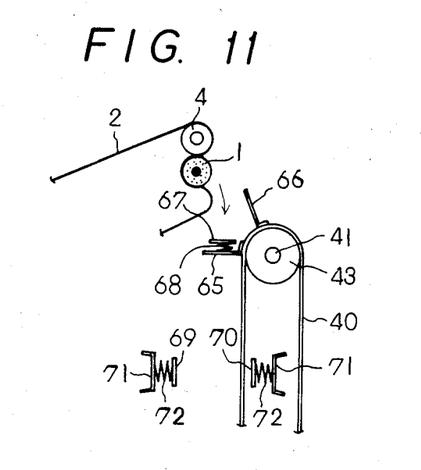
FIG. 11 shows a molding device of another embodiment of this invention and is a schematic partial side view of a condition where the maki-zushi is transferred from a rolling stage to a molding stage.
Figure 12:
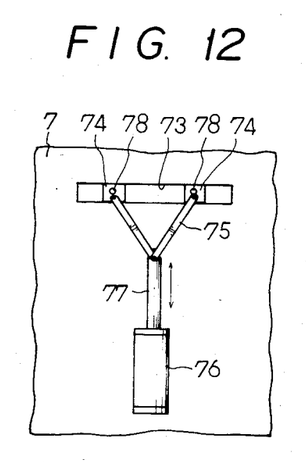
FIG. 12 is its explanatory view of the molding condition.
Figure 13:
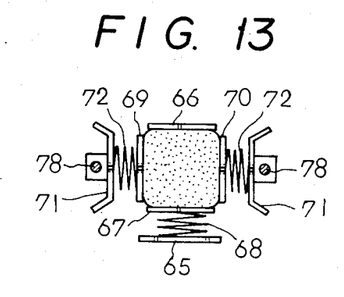
FIG. 13 is an enlarged view of its essential part showing its molding operation mechanism.
Figure 14:
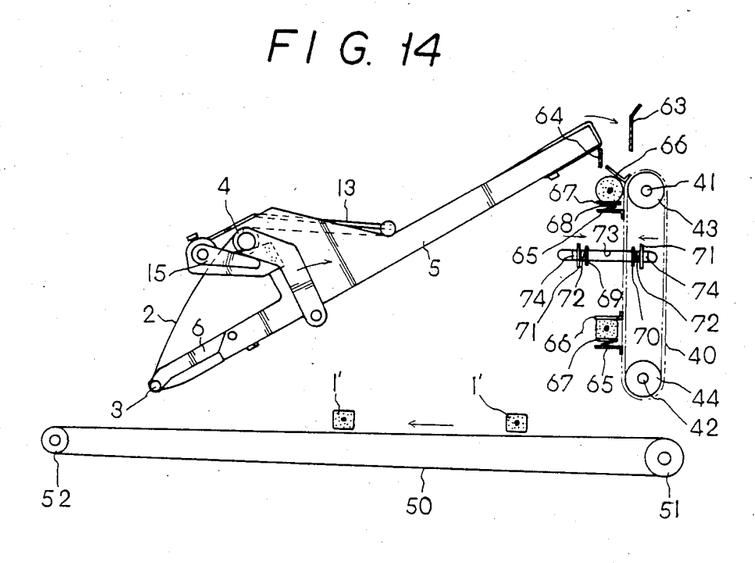
FIG. 14 is a side view showing a condition where a molding process is provided in succession to a wrapping process.

FIG. 11 throughout FIG. 14 show another embodiment of the pressure molding mechanism of the maki-zushi. In this embodiment, the chain conveyor 40 spanned between the sprockets 43 and 44 is connected to the sheet 2 by means of shoe plates 63 and 64. The chain conveyor 40 is attached with a receiving plate 65 of flat plate type and a pressure plate 66. The receiving plate 65 is supported on the chain conveyor 40 by means of a support plate 67 and a coil spring 68. The receiving plate 65 receives the maki-zushi 1 lifted in columnar shape by means of the shoe plates 63 and 64 when the chain conveyor 40 is shifted from the ascending to the descending, and stops temporarily at a predetermined fixed position in the middle of the vertical descending, and the maki-zushi 1 is pressure molded to the angular pillar shape by the pressure plate 66, and the front pressure plate 69 and the rear pressure plate 70 that move back and forth and the molds open at the lowest point, and the maki-zushi 1 molded in the angular round shape is transferred to the horizontal belt conveyor 50.

The front pressure plate 69 and the rear pressure plate 70 that move back and forth by sandwiching the chain conveyor 40 at the fixed position are respectively mounted on the support plate 71 similar to the receiving plate 65 by means of a coil spring 72, and apply the pressure to the maki-zushi 1 using the coil spring 72 as a cushion.

A mechanism for moving the front pressure plate 69 and the rear pressure plate 70 back and forth is constructed in such a way that a pair of sliders 74 and 74 are slidably inserted into an oblong guide groove scooped out in the box frame 7 of both sides, and a V-shaped link mechanism 75 is rotatably supported between each pair of sliders 74 and 74, and a lifting piston 77 of the cylinder 76 is journaled rotatably at the lower end of the link mechanism 75, and the sliders 74 and 74 inserted in each oblong guide groove are open and closed and a support plate 71 whose both ends of the support shaft 78 are fixed to each slider 74 and 74 is moved back and forth.

By the way, it is, of course, possible to utilize other mechanisms, for example, a cam mechanism, than the foregoing mechanism.

As described in the foregoing, in this invention, the shari and gu 61 such as kampye,ovs/o/ , cucumber and tuna or the like are disposed in the shari supply frame 12 on the sheet, and the nori 62 is placed on the inclined lower part and when the start switch merely is pressed, the rolling in and rolling up operation of the maki-zushi is automatically continuously carried out, and also, the maki-zushi 1 rolled in and rolled up in the circular columnar shape is automatically molded into the angular pillar shape in the next process so that the produced maki-zushi is of presentable form and is convenient for packing in a box and moreover, with an additional provision of the belt conveyor 50 for feeding, the maki-zushi that is presentable and well pressure molded is fed toward the operator so that one operator can prepare the maki-zushi 1 in good arrangement, and moreover, the production is carried out without any person touching the maki-zushi in the course of its molding and therefore, this invention is extremely sanitary apparatus which is one of many advantageous points.

What is claimed is:

1. An apparatus for producing maki-zushi which comprises in combination
   (a) a flexible planar member that comprises a first section and a second section,
   (b) means to initially support said first section in a generally horizontal position where it can receive a deposit of rice,
   (c) means to initially support said second section in an inclined disposition that extends upwardly from said first section, said inclined second section supporting a sheet of nori,
   (d) forming means to change said generally horizontal first section into a generally cylindrical cofiguration and to impart a rolling motion to said cylindrical configuration whereby an elongated cylindrical mass of rice will be formed from said rice deposit,
   (e) rolling means to roll the elongated cylindrical mass of rice formed by the forming means upwardly over the surface of said upwardly inclined second section of said flexible planar member that has the sheet of nori supported thereon, whereby the elongated cylindrical rice mass produced by said forming means will be encased by said inclined sheet of nori,
   (f) means to discharge said elongated cylindrical mass of rice encased by said nori sheet at the uppermost portion of said upwardly inclined first section and
   (d) means to return said horizontal first section from said cylindrical configuration to said original generally horizontal support configuration.

* * * * *